(12) United States Patent
Morita et al.

(10) Patent No.: US 6,272,454 B1
(45) Date of Patent: Aug. 7, 2001

(54) DEBUGGING AND COSIMULATION METHOD FOR WIDE BAND SWITCH FIRMWARE

(75) Inventors: Sumie Morita; Shigeru Sekine; Eiji Ishioka; Tomoki Someya; Noboru Ise, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/182,039

(22) Filed: Oct. 29, 1998

(30) Foreign Application Priority Data

Mar. 20, 1998 (JP) .................................................. 10-072836

(51) Int. Cl.$^7$ ...................................................... G06F 9/455
(52) U.S. Cl. ................................................ 703/28; 703/26
(58) Field of Search ................................ 703/13, 14, 23, 703/27, 28, 26

(56) References Cited

U.S. PATENT DOCUMENTS 5,546,562 * 8/1996 Patel ........................................ 703/14
6,009,256 * 12/1999 Tseng et al. ............................ 703/13

FOREIGN PATENT DOCUMENTS 7-262045   10/1995   (JP) .

OTHER PUBLICATIONS

A.M. Gallagher, *Integration Techniques for VXIbus Instrumentation Systems*, Autotestcon '90, IEEE Systems Readiness Technology Conference, 'Advancing Mission Accomplishment', 1990, pp. 183–185.*

D. Becker et al., *An Engineering Environment for Hardware/Software Co–Simulation*, Design Automation Conference, 29th ACM/IEEE, 1992, pp. 129–134.*

P.C. Ching et al., *An In–Circuit Emulator for TMS320C25*, IEEE Transactions on Education, vol. 37, No. 1, Feb. 1994, pp. 51–56.*

C.A. Valderrama et al., *Automatic Generation of Interfaces for Distributed C–VHDL Cosimulation of Embedded Systems*: an Industrial Experience, 7th IEEE Int'l Workshop on Rapid System Prototyping, 1996, pp. 72–77.*

W. Fornaciari et al., *A Two–Level Cosimulation Environment*, Computer, vol. 30, No. 6, Jun. 1997, pp. 109–111.*

J. Marantz, *Enhanced Visibility and Performance in Functional Verification by Reconstruction*, Design Automation Conference, 1998, Proceedigns, pp. 164–169.*

* cited by examiner

Primary Examiner—Kevin J. Teska
Assistant Examiner—Russel W. Frejd
(74) Attorney, Agent, or Firm—Helfgott & Karas, P.C.

(57) ABSTRACT

An RS232C driver inside target firmware controls an RS232C interface. An OS debugger steals an input to and an output from another function block that is the actual target firmware, and exchanges that input and output with the RS232C driver 1005. This configuration makes it possible to easily connect a device that executes the target firmware to, for example, a personal computer, using a general purpose RS232C interface, and makes it possible to easily obtain debugging operation using the PC side debugger.

12 Claims, 11 Drawing Sheets

```
/* SEPARATE SECTION DOWNLOADING START REQUEST          */
/* DL-ISTA-RQ                                          */
/* Version 1.0.0 197/11/19                             */
/* SHW= 4, TYPE = 1 (Command FROM CC)                  */
/* PAC-SP HEADER VERSION CORRESPONDING TO P-MIFCOM     */
/* FORM OF COMMUNICATION COMMON SECTION=1, SEPARATE SECTION = 0 */

/*----COMMAND TYPE EXISTS----*/

/* ---- COMMAND TYPE ------ */
00000000
/*-----PAC-SP HEADER --------*/
00008c01  0600001C  7f7f7f7f  7f7f7f7f
00000000  00000000  00000000  00000000
00000020  00060001  00000000  00000000
00000000  00000000  00000000  00000000
/* ---COMMAND HEADER--- */
0000000C  00060001  00010000  00000000
/* ----CONTROL INFORMATION 1- */
/* ----LIST HEADER------ */
00000000  00000000  00000008  00010010
/* ---- INSTANCE 1------ */
00000000  00000001  00000001  00000000
/* -----EOF------------ */
```

FIG. 6

| No. | NAME OF FUNCTION | DESCRIPTION | SUPPORTING DEBUGGER |
|---|---|---|---|
| 1 | EMULATION OF SOFTWARE – FIRMWARE INTERFACE | SENDS COMMANDS TO/ RECEIVES COMMANDS FROM SOFTWARE | RS232C FUNCTION BLOCK |
| 2 | RS232C FLAG CONTROL | CONTROLS FLAG THAT SWITCHES STATUS DESTINATION | OS DEBUGGER<br><br>RS232C FUNCTION BLOCK |
| 3 | MEMORY READ/WRITE | READS FROM AND WRITES TO ARBITRARY MEMORY ADDRESS | OS DEBUGGER<br><br>RS232C FUNCTION BLOCK |
| 4 | READ/WRITE OF INPUT/OUTPUT- MAPPED INPUT/OUTPUT | READS FROM AND WRITES TO ARBITRARY INPUT/OUTPUT PORT | OS DEBUGGER<br><br>RS232C FUNCTION BLOCK |
| 5 | MEMORY FILL | FILLS ARBITRARY MEMORY ADDRESS | OS DEBUGGER<br><br>RS232C FUNCTION BLOCK |
| 6 | CHECK COMMAND | CHECKS NORMALITY OF RS232C LINE STATUS | OS DEBUGGER<br><br>RS232C FUNCTION BLOCK |
| 7 | VCC COMMAND | READS FROM AND WRITES TO EXTERNAL MEMORY (VCC). CANNOT BE USED DURING BREAK | OS DEBUGGER RS232C FUNCTION BLOCK |
| 8 | DIAGNOSIS OF RS232C-LSI (SELF- DIAGNOSIS) | PERFORMS DIAGNOSIS OF RS232C-LSI | OS DEBUGGER RS232C FUNCTION BLOCK |
| 9 | BREAK FUNCTION | SETS A BREAK POINT | OS DEBUGGER |
| 10 | TRIGGER FUNCTION | SETS A TRIGGER POINT | OS DEBUGGER |
| 11 | EVENT TRACING CONTROL | CONTROLS EVENT TRACING | OS DEBUGGER |
| 12 | TSS DUMP | DUMPS THE TSS OF A SPECIFIED TASK | OS DEBUGGER |
| 13 | DESCRIPTOR DUMP | DUMPS ARBITRARY SLOT OF GDT, LTD OR IDT | OS DEBUGGER |

FIG. 11

DEBUGGING AND COSIMULATION METHOD FOR WIDE BAND SWITCH FIRMWARE

BACKGROUND OF THE INVENTION

1. Field of the Invention

This invention relates to technology for the sharing of a testing and debugging environment for the purpose of both on-line and off-line testing and debugging of firmware functions that are incorporated into devices containing microprocessors, in a wide band switch (switching unit).

2. Description of the Related Art

In the past, in narrow band switching little development effort was required because the scale of the firmware was small. In addition, each unit had to be tested individually because the hardware configuration of each was different.

Consequently, it was not permissible for firmware to contain bugs. In an on-line system, if a problem occurred at the site where that system was installed, a great deal of effort was required to investigate the cause.

In recent years, as switch band widths have been becoming wider, in order to lighten the load on software the scale and complexity of the firmware used to control the hardware have been continually increasing. Naturally, since the function of firmware differs depending on the unit into which it is incorporated, a single system can contain several tens of pieces of firmware. In addition, as the scale becomes larger quality deteriorates, and more and more problems have been occurring at sites where systems are installed.

In debugging firmware, in the past in-circuit emulators were used, but as hardware has become faster acting, if the device concerned is operating on-line, in some cases it becomes impossible for the operation of an in-circuit emulator to keep up with it so that the in-circuit emulator cannot function normally. In particular, this problem occurs frequently in cases of duplexed devices.

SUMMARY OF THE INVENTION

This invention has been conceived in light of the background described above, for the purpose of making it easier to debug firmware.

The first embodiment of this invention provides a device for the purpose of debugging the device that executes the target firmware inside the various devices that compose the wide band switching system.

The device that executes the target firmware includes a general purpose interface driver module that controls the input to and output from a general purpose interface such as an RS232C (the RS232C driver 106), and a debugger module (OS debugger 105) that captures the input/output to/from the target firmware and switches that input/output with the general purpose interface module.

The above-described configuration of the first embodiment of this invention makes it possible to easily connect a device that executes each type of firmware that composes (for example) a wide band switching system to a personal computer using (for example) a general purpose RS232C interface, which in turn makes it possible to easily obtain debugging operation using the debugger in the personal computer.

In addition, since the target firmware does not need to know the debugging status, on-line operation is possible.

As a result, it is easy to debug a system at the location where the system is installed.

Further, by for example operating the debugger module and the general purpose interface module in a space at privilege level 0 independent of the operating system that executes the target firmware, it becomes possible to debug all of the high speed devices that compose the wide band switching system.

In the configuration of this invention described above, it is possible to also include a file loading module that loads desired firmware or test programs into the memory area managed by the debugger module (OS debugger 105).

In this configuration, even in the in-house pre-shipment inspection it is possible to easily connect a device that executes the various types of firmware that compose a wide band switching system to a personal computer using for example a general purpose RS232C interface, making it possible to easily load test programs and carry out the pre-shipment tests.

In addition, in the first embodiment of this invention, it is possible to easily obtain a high performance debugging environment by having the debugger module provide debugging functions corresponding to an in-circuit emulator through a general purpose interface.

The second embodiment of this invention provides a device for the purpose of performing debugging or simulation of the device that executes the target firmware in the various devices that compose a wide band switching system.

The device that executes the target firmware and the target firmware simulation program or the hardware simulation program includes a general purpose interface driver module that controls the input to and the output from the general purpose interface (the RS232C driver 1005), and a connector module (the firmware connector 1004 and the hardware connector 1008) that captures the input to and the output from the target firmware and the target firmware simulation program or the hardware simulation program, then inputs it to or outputs it from a socket established between itself and another device or terminal that executes cosimulation, and in addition switches the data communicated through that socket with a general purpose interface driver module.

The configuration of the second interface of this invention described above makes it possible to easily connect a terminal that emulates operations of a peripheral device to a target device, even if the actual peripheral device is not connected, using a general purpose interface, and to simulate the operations of the target device with that terminal.

In the above described second embodiment of this invention, the connector module can be configured so that it captures the input to and output from a plurality of target firmware, target firmware simulation programs and/or hardware simulation programs, and assigns identifiers to them for the purpose of uniquely identifying each piece of hardware or firmware.

This configuration makes it possible to test target devices with only the target device itself and a terminal that is connected to it through a general-purpose interface, without connecting the plurality of peripheral devices that would normally be connected to the target device.

In particular, in the configuration described above, cosimulation among a plurality of independent devices each containing firmware, and cosimulation with respect to communication among duplexed devices, can easily be achieved.

BRIEF DESCRIPTION OF THE DRAWINGS

Other purposes and characteristics of this invention can be easily understood by a person engaged in the trade from the attached drawings and the description of the preferred embodiments.

FIG. 6 shows an example of the command data format in the second preferred embodiment of this invention.

FIG. 11 gives a list of the debugger functions that are available in the first through third preferred embodiments of this invention.

DESCRIPTION OF THE PREFERRED EMBODIMENTS

Figure 1:
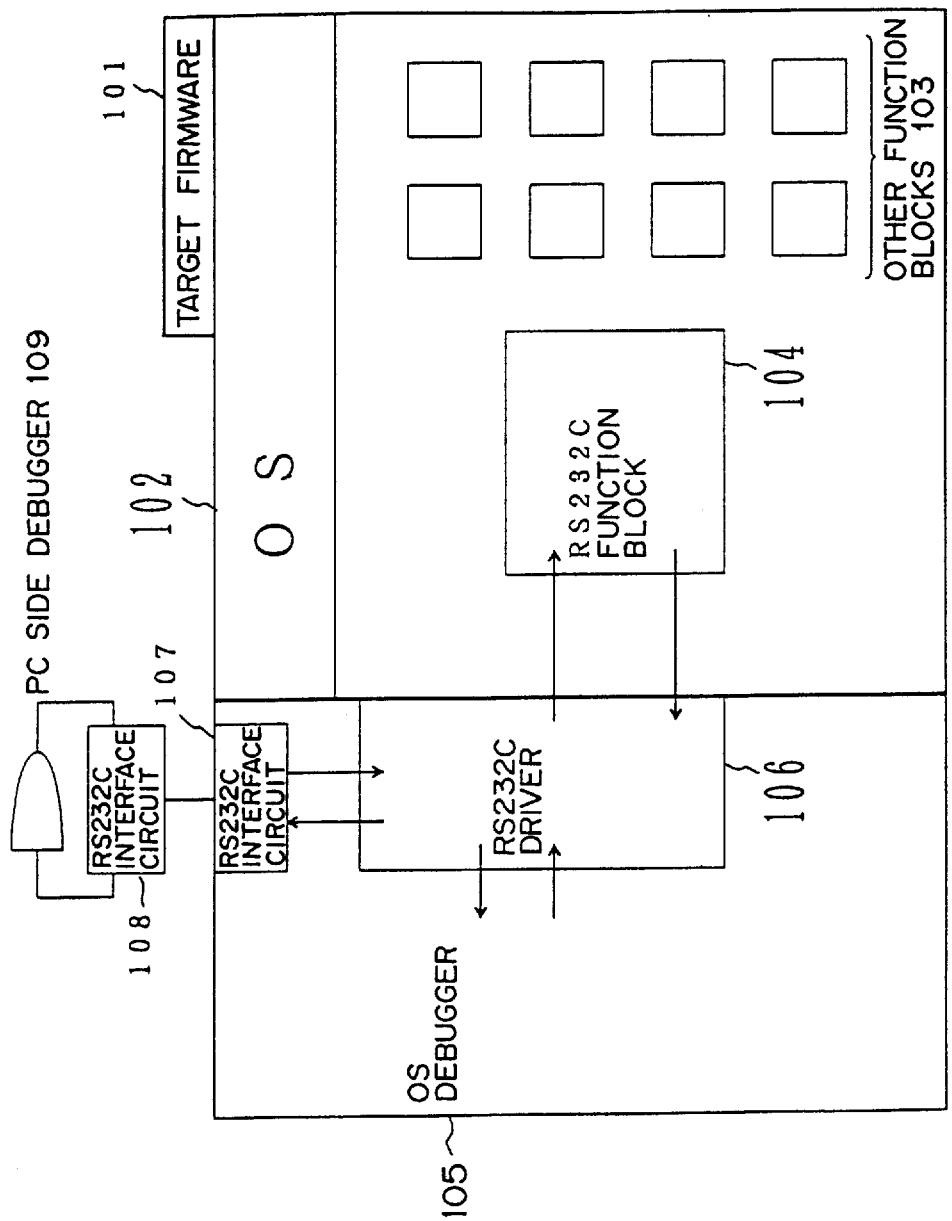
FIG. 1 is a configuration diagram of the first preferred embodiment of this invention.

Let us now explain the preferred embodiments of this invention in detail, referring to the drawings.

<The first Preferred Embodiment of This Invention>

FIG. 1 is a configuration diagram of the first preferred embodiment of this invention.

In the first preferred embodiment of this invention, RS232C serial interfaces (abbreviated below as RS232C interfaces), which are general purpose interfaces, are installed in all devices that execute the target firmware 101. One characteristic of this invention is that the commands and statuses that are input to and output from the target firmware 101 can easily communicate with the PC side debugger 109, that is, for example, installed in a personal computer.

In FIG. 1, first the target firmware 101 runs on, for example, an Intel i80486 processor.

The OS debugger 105 that is installed in the target firmware 101 receives commands from the PC side debugger 109 via the PC side RS232C interface circuit 108, the target firmware 101 side RS232C interface circuit 107 and the RS232C driver 106 inside the OS debugger 105.

Depending on the content of that received command, the OS debugger 105 either processes it internally or transfers it to the RS232C function block 104 via the RS232C driver 106.

The RS232C function block 104 transfers the command received from the RS232V driver 106 inside the OS debugger 105 to other function blocks 103 that execute the operation of each piece of firmware under the control of the OS (operating system) 102. The other function blocks 103 process the received command as an input command unaware of the fact that it was received from the RS232C interface circuit 107.

When the system is in debugging mode, the other function blocks 103 output a status to the system as a normal operation. This status is transferred to the RS232C driver 106 inside the OS debugger 105 by the RS232C function block 104.

Depending on the content of the status that was transferred to the RS232C driver 106 from the RS232C function block 104, the OS debugger 105 either processes it internally or transfers it to the PC side debugger 109 via the target firmware 101 side RS232C interface circuit 107 and the PC side RS232C interface circuit 108.

The OS debugger 105 supports existing exclusive debugging commands such as memory read and write, and also a break function that uses the i80486 processor debugging function.

The RS232C function block 104 operates as an application at privilege level 3 supervised by the OS 102. Meanwhile, the OS debugger 105 is a program at privilege level 0 that operates in a space separated from and independent of the OS 102.

The OS debugger 105 achieves multitask operation. These tasks are not activated by the OS 102, but are directly activated by the i80486 processor that supports the multitask function.

The OS 102 is completely unaware of the operation of the OS debugger 105.

The configuration of the first preferred embodiment of this invention that is described above makes it possible to easily connect a device that executes the various types of firmware that compose a wide band switching system to, for example, a personal computer, using a general purpose RS232C interface, and thus to easily achieve debugging operation using the PC side debugger 109.

In addition, the second function blocks 103 does not need to be aware of the debugging status, so that on-line operation is possible.

As a result, a system can easily be debugged at the site where it is installed.

Further, the OS debugger 105 and the RS232C driver that is contained in it operate in a space at privilege level 0 that is separated from and independent of the OS 102, so that it becomes possible to debug a variety of devices that act at high speed and comprise a wide band switching system.

Figure 2:
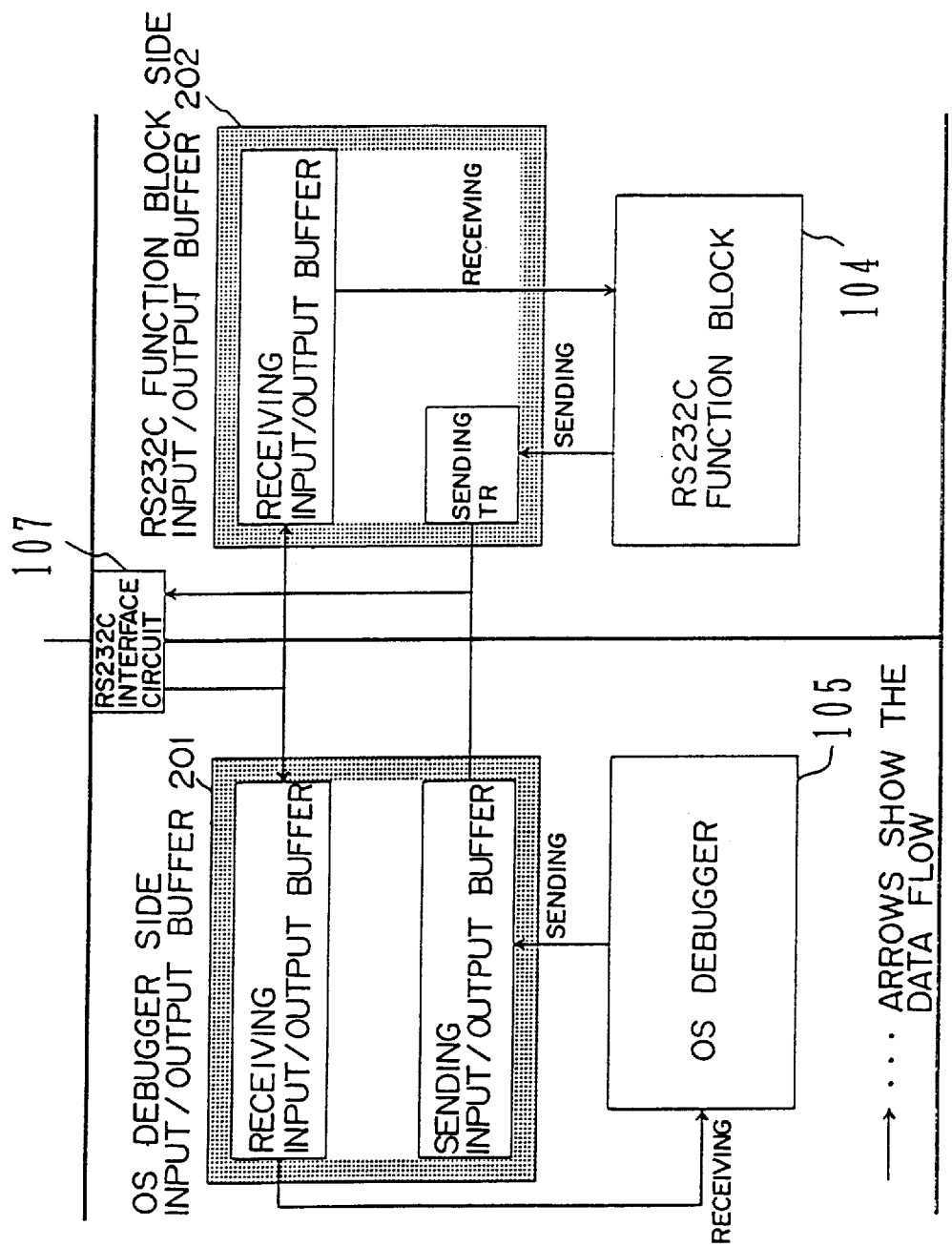
FIG. 2 is a diagram explaining the input/output buffers of the OS debugger and the RS232C function block in the first preferred embodiment of this invention.

FIG. 2 shows the configuration of the OS debugger side input/output buffer 201 that is located on the OS debugger 105 side in FIG. 1, and of the RS232C function block side input/output buffer 202 that is located on the RS232C function block 104 side in FIG. 1.

The OS debugger 105 has 2 input/output buffers, one used for receiving commands and one used for sending the status. Each of these input/output buffers has a size of 1,200 h bytes.

Meanwhile, the RS232C function block 104 uses 2 independent input/output buffers that are exclusively used for this block, one that is used to receive commands and one that is used to send the status, without using the OS debugger 105 input/output buffers.

<The second Preferred Embodiment of This Invention>

Figure 3:
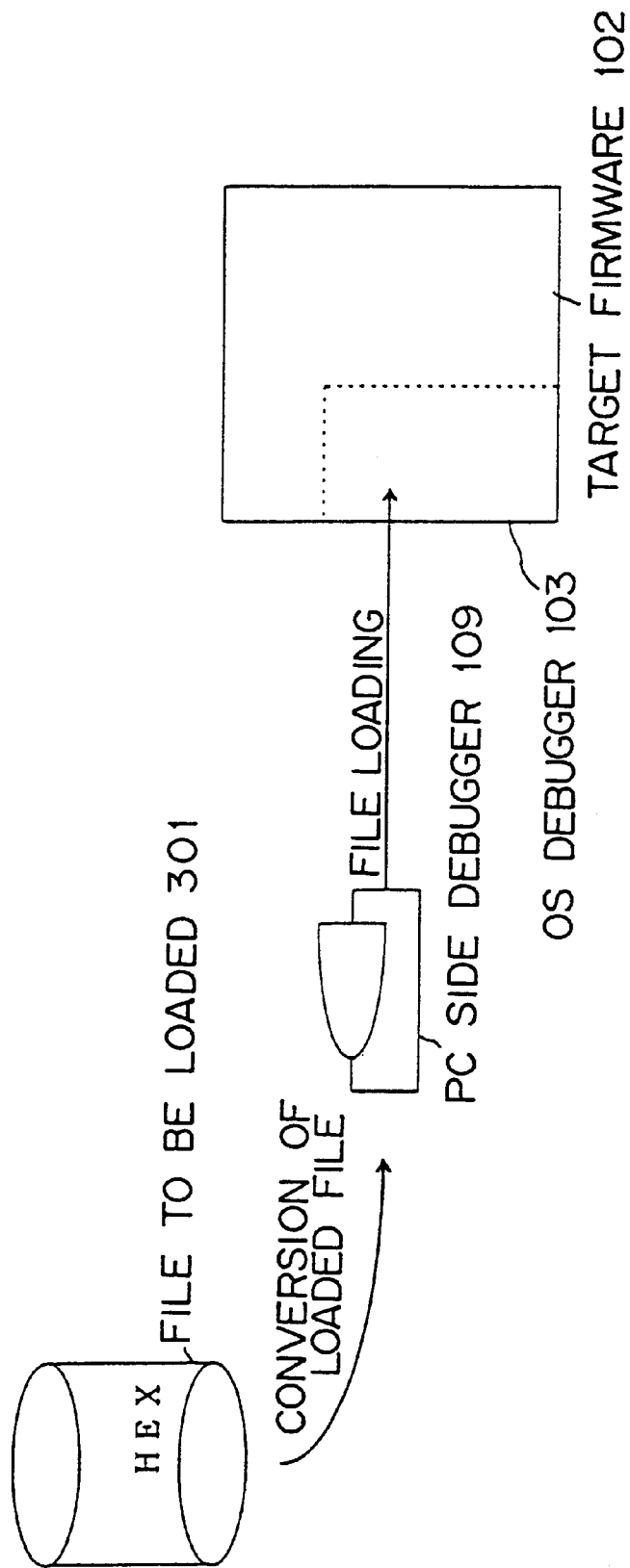
FIG. 3 is a configuration diagram of the second preferred embodiment of this invention.

FIG. 3 is a configuration diagram of the second preferred embodiment of this invention.

The second preferred embodiment of this invention is based on the configuration of the first preferred embodiment of this invention. It is a characteristic of this invention that the desired firmware or test program can be loaded from the PC side debugger 109 to a memory area supervised by the OS debugger 105 inside the target firmware 101.

This makes it possible to easily connect a device that executes the various types of firmware that compose a wide band switching system to, for example, a personal computer, via a general purpose RS232C interface, even in an in-house pre-shipment inspection in a manufacturing plant, thus making it possible to easily conduct the pre-shipment inspection by loading a test program.

In FIG. 3, a file 301 that is to be loaded has, for example, the Intel HEX format, which is a 32-bit expanded format.

The PC side debugger 109 converts the data format of that file 301 that is to be loaded to the OS debugger 105 side data format, then that file 301 that is to be loaded is loaded into a memory area that is supervised by the OS debugger 105 via the RS232C interface that was explained in the discussion of the first preferred embodiment of this invention with reference to FIG. 1.

When a command or status used in normal debugging, as explained with reference to FIG. 1, is sent or received, the RS232C interface data transfer rate is 2,400 bps, but when a file is loaded as shown in FIG. 3, that data transfer rate is switched to 9,600 bps. When the file loading is completed, the said data transfer rate returns to 2,400 bps.

When file loading starts, the second function blocks 103 inside the target firmware 101 are unconditionally set to break status.

When file loading is completed, the status of the second function blocks 103 returns to the status before file loading started. If the status before file loading started was target execution status, it returns to that target execution status; if it was break status, then it returns to that break status.

To prevent break/trigger detection while file loading is in progress, when file loading starts all break/trigger points, including those that have been temporarily released, are released. Even after file loading is completed, those break/trigger points are not reset.

Figure 4:
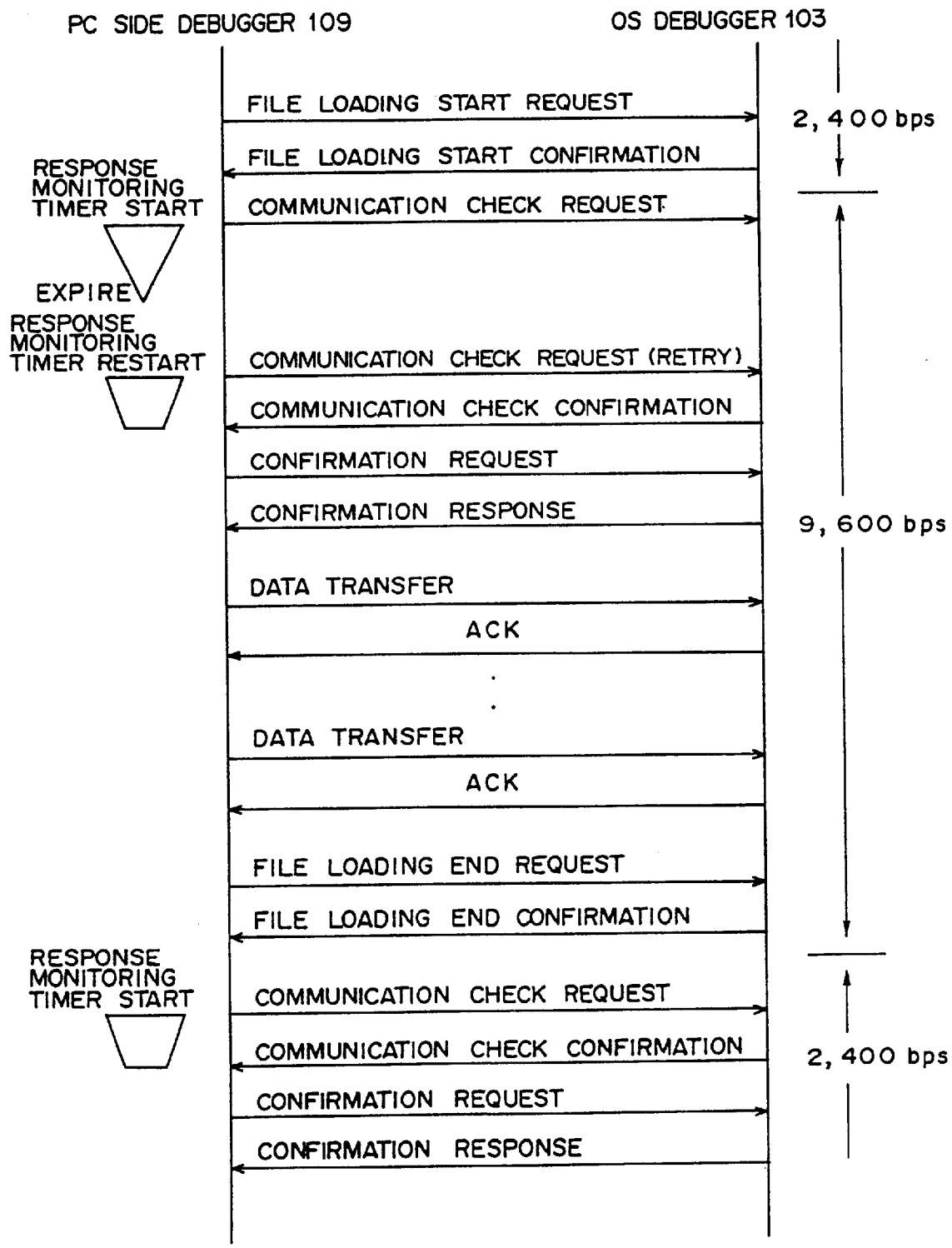
FIG. 4 shows the file loading sequence in the second preferred embodiment of this invention.

FIG. 4 shows the file loading action sequence that takes place in the configuration of the second preferred embodiment of this invention shown in FIG. 3.

The OS debugger 105 receives a file load starting request, and in response sends a file load starting confirmation to the PC side debugger 109. Immediately after that, the RS232C interface data transfer rate is switched to 9,600 bps.

In order to confirm that communication is proceeding normally after the transfer rate is switched, after the PC side debugger 109 receives the file load starting confirmation it sends a communication check request to the OS debugger 105.

The PC side debugger starts a response monitoring timer for 2 seconds at the time of sending the communication check request and waits for a response from the OS debugger 105 (communication check confirmation) in regard to the sent communication check request.

If the PC side debugger 109 does not receive a communication check confirmation within 2 seconds, it restarts the response monitoring timer and repeats the communication check request.

If there is no response from the OS debugger 105 to 5 communication check requests including retries, the PC side debugger 109 aborts the file load processing in error.

After the PC side debugger 109 receives a communication check confirmation, it sends a confirmation request and posts the fact that communication between the PC side debugger 109 and the OS debugger 105 is normal to the OS debugger 105. After the OS debugger 105 receives the confirmation request, it sends a confirmation response.

Subsequently, data transfer starts upon receipt of a data transfer command sent from the PC side debugger 109 to the OS debugger 105. The OS debugger 105 always sends an ACK status in response to each data transfer command.

When the OS debugger 105 receives a file load ending request from the PC side debugger 109, immediately after a file load reception confirmation is sent to the PC side debugger 109, the RS232C interface data transfer rate returns to 2,400 bps.

Then the response monitoring timer is started and the normality of communication confirmed through a sequence similar to that followed in starting the file loading.

After the data transfer rate has returned to 2,400 bps without problem and a 2,400 bps confirmation response is sent, the OS debugger 105 ends the file load processing.

Figure 5:
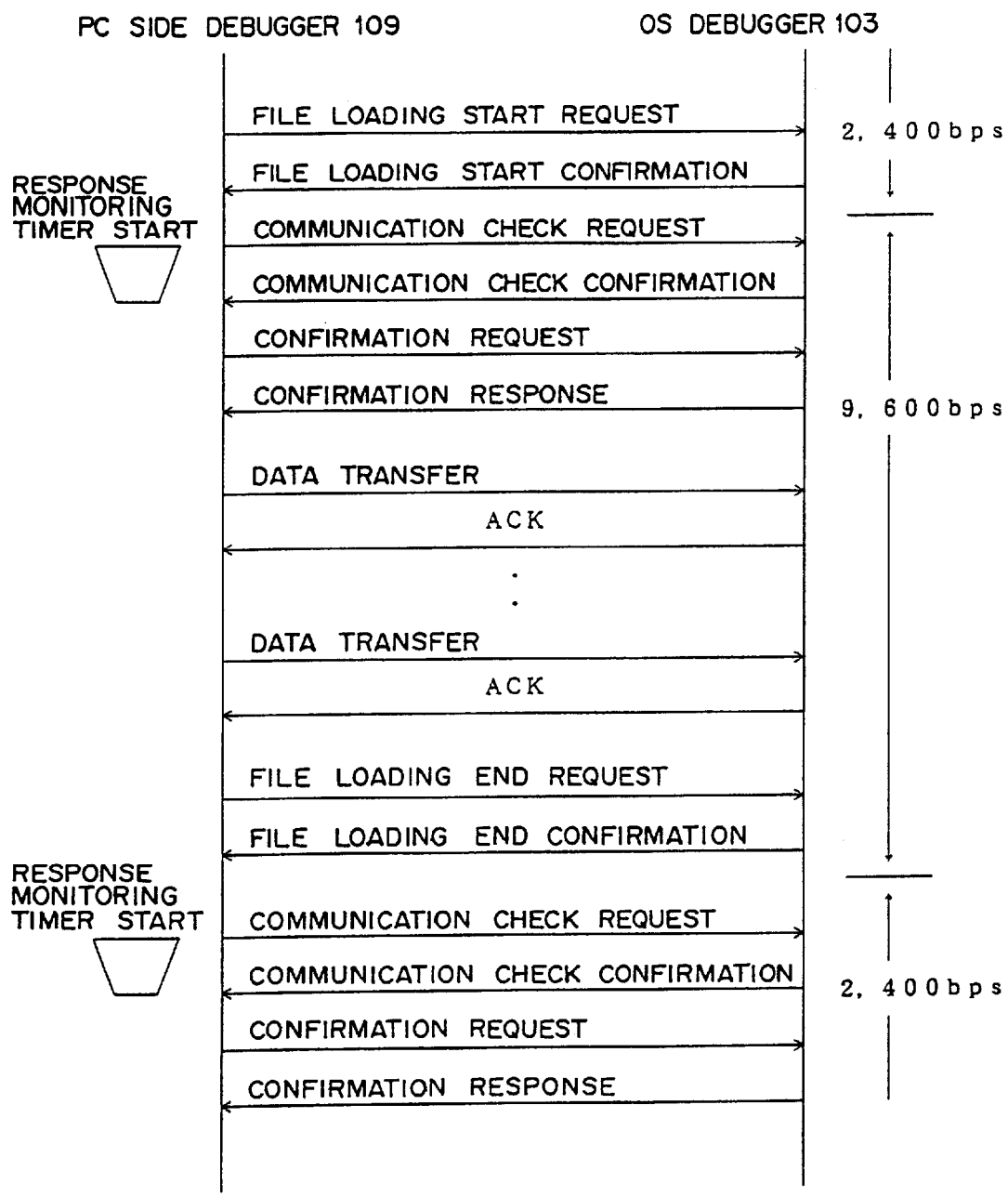
FIG. 5 shows the file load canceling sequence in the second preferred embodiment of this invention.

FIG. 5 shows the file loading cancellation action sequence that is followed in the configuration of the second preferred embodiment of this invention shown in FIG. 3. The basic action when file loading starts is the same as the operation sequence shown in FIG. 4.

The file loading cancellation processing is as follows. While file loading is in progress, if a cancellation instruction is given by the user who is operating the PC side debugger 109, that instruction is executed by sending a file loading abortion request from the PC side debugger 109 side to the OS debugger 105.

When the file loading abortion request is received, the OS debugger 105 forcibly terminates the file loading and sends a file loading abortion confirmation to the PC side debugger 109.

Subsequent processing is the same as the basic action when file loading is completed as shown in the action sequence in FIG. 4.

FIG. 6 shows the format of a file loading start request as an example of a command/status data format in communication between the PC side debugger 109 and the OS debugger 105 during file loading. Thus, command/status communication takes place in a binary sequence on the RS232C interface.

<The third Preferred Embodiment of This Invention>

The third preferred embodiment of this invention produces a cosimulation system.

Figure 7:
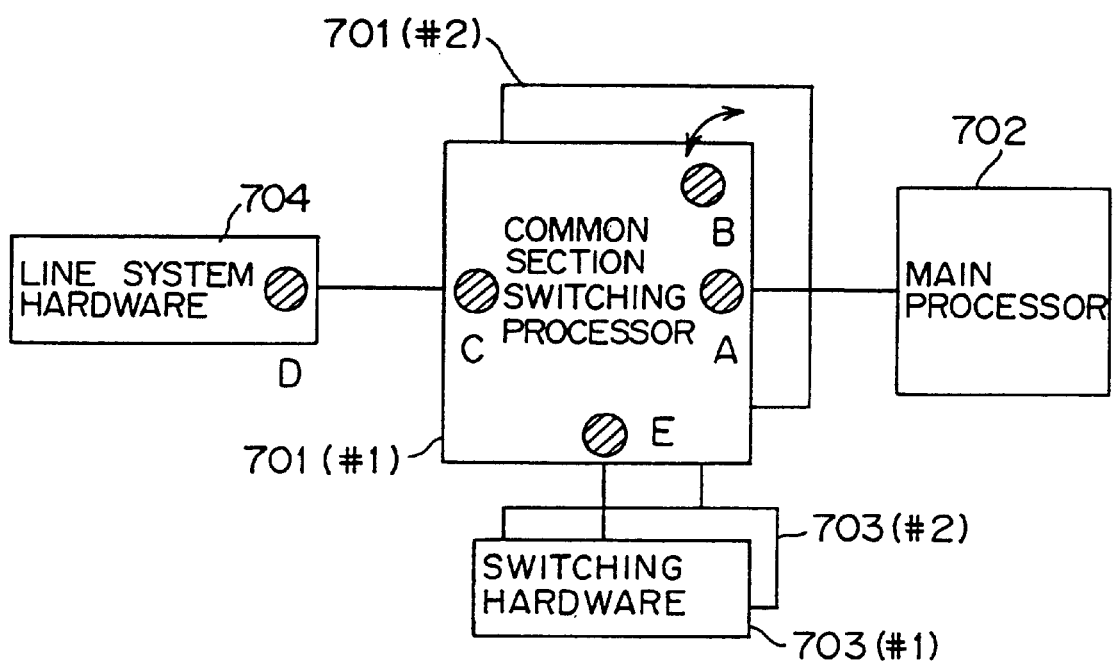
FIG. 7 is a diagram explaining the cosimulation system.

First, let us explain what a cosimulation system is, using FIG. 7.

In general, as shown in FIG. 7, a wide band switching system consists of, for example, a wide variety of hardware including line system hardware 704 that terminates the line, duplexed switching hardware 703 (#1/#2), duplexed shared switching processors 701 (#1/#2) that control the line system hardware 704 and the switching hardware 703 in common, and a main processor 702 that controls the whole system; and a variety of function blocks that control that hardware.

Here, focusing attention on for example the common switching processor 701, this function block has the following functions.

A: Control of communication between the main processor 702 and the common switching processor 701.
B: Control of communication between the #1 and #2 systems in the duplexed common switching processor 701.
C/D: Control of communication between the common switching processor 701 and the line system hardware 704 (D is a function of the line system hardware 704 side).
E: Control of communication between the common switching processor 701 and the switching hardware 703.

When testing a common switching processor 701 that has the functions A to C and E, the operation of the wide band switching system itself is complicated, so until now it has been necessary to actually connect the main processor 702, the switching hardware 703 and the line system hardware 704 to the common switching processor 701 in order to do the testing.

Figure 8:
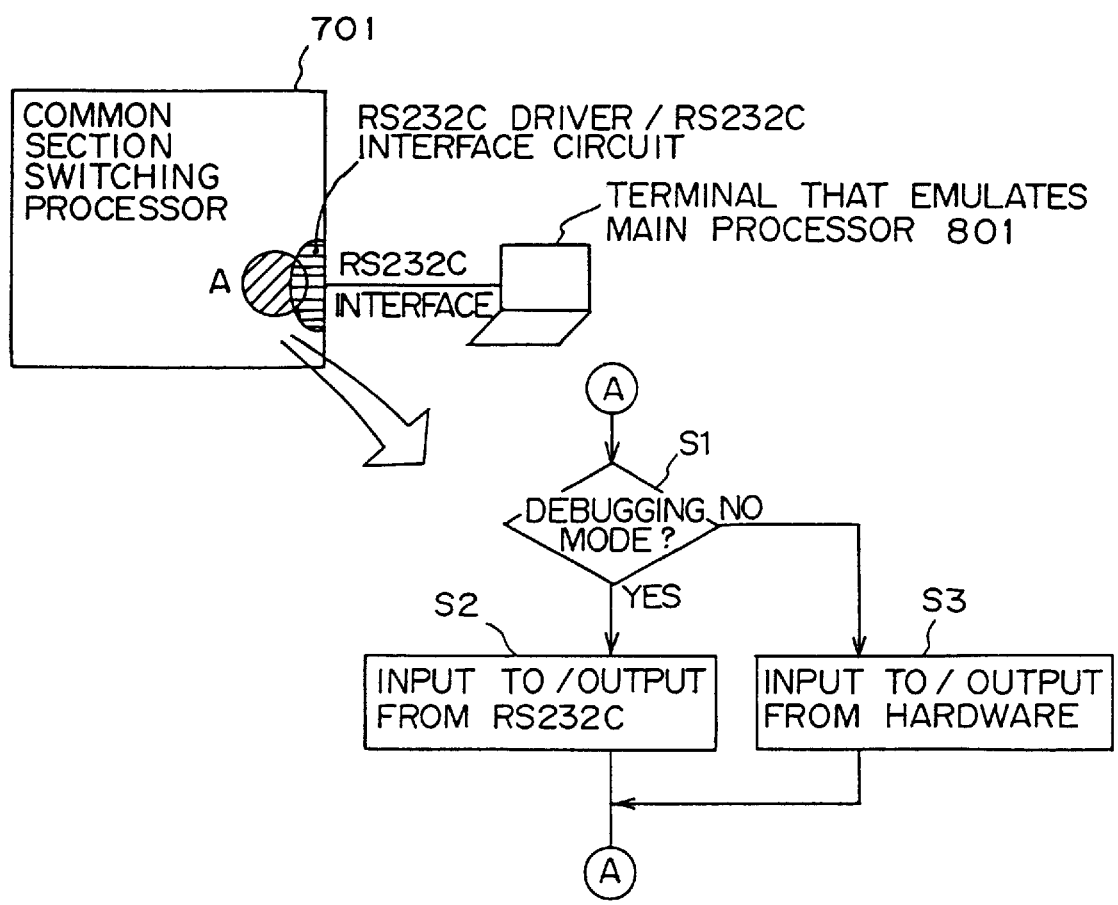
FIG. 8 is a configuration diagram (1 of 3) of the third preferred embodiment of this invention.

In the third preferred embodiment of this invention, as shown in FIG. 8, for each of the inputs to and outputs from the firmware that provides the various functions (A to C and E) in for example the common switching processor 701 are provided with mechanisms that permit connection to the RS232C driver/RS232C interface circuit 802 separately from the actual hardware connectors; those mechanisms are connected to the terminal 801 that emulates the main processor through the RS232C interface.

When the system is not in debugging mode, the input and output signals for the various functions are input to and output from the actual hardware (the branch S1 to S3 in FIG. 8); when the system is in debugging mode, the inputs and outputs are not to and from the actual hardware but the RS232C interface (the path S1 to S2 in FIG. 8).

The configuration shown in FIG. 8 makes it possible to simulate the operation of the main processor 702 using the terminal 801 which emulates the main processor, even if, for example, the actual main processor 702 is not connected to the common switching processor 701.

Figure 9:
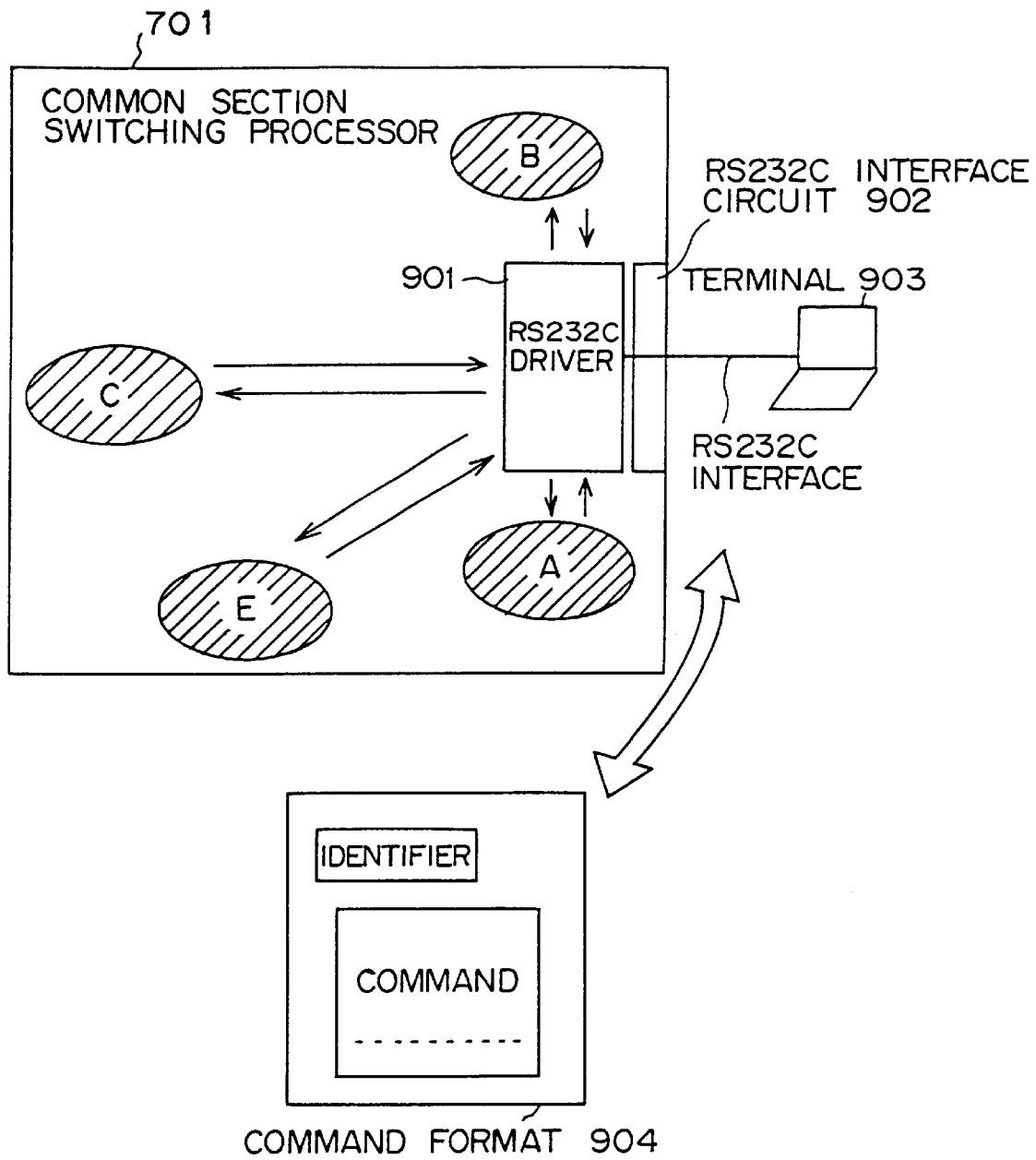
FIG. 9 is a configuration diagram (2 of 3) of the third preferred embodiment of this invention.

Further, in the third preferred embodiment of this invention, as shown in FIG. 9, the configuration is such that, for example, all of the inputs to and outputs from the firmware A to C and E in the common switching processor 701 are connected to a common RS232C driver 901 and RS232C interface circuit 902, and one terminal 903 is connected to this circuit through an RS232C interface.

Here, 4 debugging flags are defined. These are assigned to the functions A, B, C and E, respectively. For all of the commands that are communicated between the common switching processor 701 and the terminal 903, as shown by 904 in FIG. 9, it can perform a distribution for each command by assigning identifiers to the debugging flags defined for the functions corresponding to those commands in both the common switching processor 701 and the terminal 903.

The configuration shown in FIG. 9 makes it possible to test the common switching processor 701 using only the common switching processor 701 and the terminal 903 that is connected to it, without connecting the main processor 702, the switching hardware 703 or the line system hardware 704 to the common switching processor 701.

Figure 10:
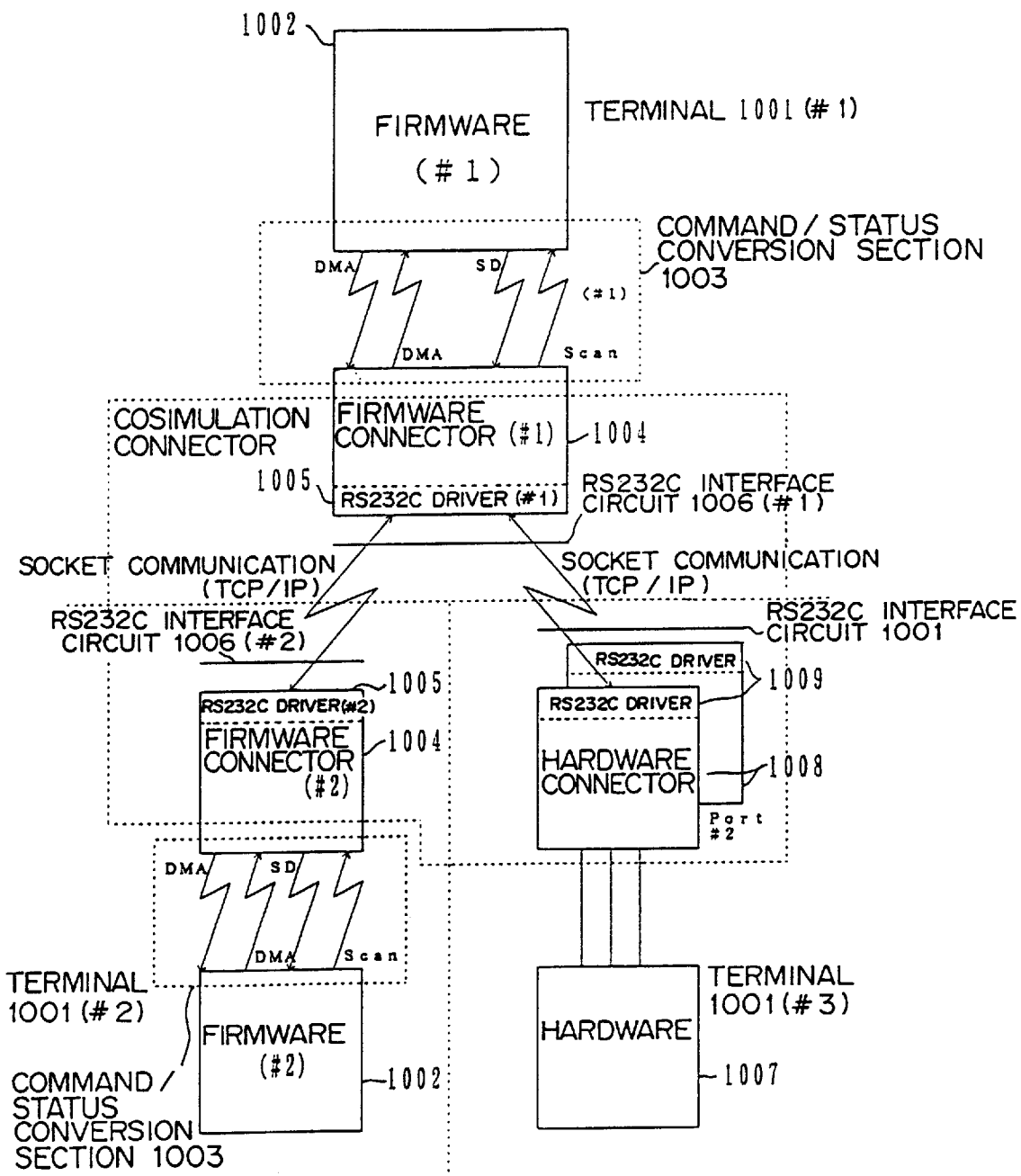
FIG. 10 is a configuration diagram (3 of 3) of the third preferred embodiment of this invention.

FIG. 10 shows a different configuration of the third preferred embodiment that is used in the cosimulation system of this invention.

In this configuration, it is possible to test the operation of the firmware and hardware that compose the wide band switching system by only simulating the firmware 1002 (#1/#2) and the hardware 1007 on the terminals 1001 (#1/#2/#3), and connecting the terminals 1001 together, without using the actual hardware.

In this case, the firmware 1002 (#1) that is simulated in the terminal 1001, the firmware 1002 (#2) that is simulated in the terminal 1001 (#2) and the hardware 1007 that is simulated in the terminal 1001 (#3) can communicate with each other through the command/status conversion section 1003 (#1)/firmware connector 1004 (#1), the command/status conversion section 1003 (#2)/firmware connector 1004 (#2) and the hardware connector 1008 (Port #1 or Port #2), respectively.

The firmware connector 1004 and the hardware connector 1008 have the function of converting all communication operations between the firmware 1002 and the hardware 1007 corresponding to them and other firmware 1002 and hardware 1007 that take place on the actual system into communication operations between the terminals 1001.

More specifically, the firmware connector 1004 and the hardware connector 1008 convert communication actions between the firmware 1002 and the hardware 1007 into socket communications in accordance with the TCP/IP protocols between the terminals 1001.

In addition, the command/status conversion section 1003 executes conversion processing between the DMA command/status or SD command/Scan status input to and output from the firmware 1002, and the socket numbers controlled by the firmware connector 1004.

Further, a function that is particularly characteristic of this invention is that the firmware connector 1004 and the hardware connector 1008 have RS232C drivers 1005 for the purpose of converting the above mentioned socket communications into RS232C interface communications. Communications between terminals 1001 are executed through the RS232C interface circuit 1006 that is controlled by this RS232C driver 1005.

The configuration shown in FIG. 10 makes it possible to very easily construct a simulation environment, even in a cosimulation system that simulates the firmware 1002 or the hardware 1007, which comprises a wide band switching system by itself when the terminals 1001 are connected to one another via an RS232C interface which is a general purpose interface.

<Details of the debugger functions>

A list of the debugger functions obtained in the first through third preferred embodiments of this invention described above is presented in FIG. 11.

What is claimed is:

1. A wide band switch debugging device for performing debugging of a device that executes target firmware in a system, wherein the device that executes target firmware comprising:

a general purpose interface driver module controls inputs to and outputs from a general purpose interface; and a debugger module captures inputs to and outputs from the target firmware for debug processing and switches said inputs and outputs with said general purpose interface driver module.

2. A device as set forth in claim 1, wherein said general purpose interface is an RS232C serial interface.

3. A device as set forth in claim 1, further comprising:

a file loading module loads a desired firmware or a test program into a memory area which manages said debugger module.

4. A device as set forth in claim 3, wherein said general purpose interface is an RS232C serial interface.

5. A device as set forth in claim 1, wherein said debugger module provides a debugging function that corresponds to an in-circuit emulator through said general purpose interface.

6. A device as set forth in claim 5, wherein said general purpose interface is an RS232C serial interface.

7. A device as set forth in claim 1, wherein said debug processing includes processing content of said captured inputs and outputs and determining whether said debugger module either processes the content internally or switches said captured inputs and outputs with said general purpose interface driver module.

8. A wide band switch cosimulation device for performing debugging or cosimulation of a device that executes target firmware in a system, wherein the device that executes a simulation program for the target firmware or a simulation program for a hardware comprising:

a general purpose interface driver module controls inputs to and outputs from a general purpose interface; and a connector module captures simulation programs for said target firmware or inputs and outputs of simulation programs for the hardware, and inputs them to or outputs them from a socket that is established between itself and another device or terminal that executes cosimulation, and additionally switches the data communicated through said socket with said general purpose interface driver module.

9. A device as set forth in claim 8,
wherein said connector module captures inputs to and outputs from a plurality of the pieces of target firmware, simulation programs for the pieces of target firmware and/or simulation programs for the pieces of hardware, and assigns identifiers that uniquely identify each pieces of the firmware or hardware.

10. A device as set forth in claim 8,
wherein the cosimulation is executed between a plurality of devices that are installed respectively in independent pieces of firmware.

11. A device as set forth in claim 8,
wherein the cosimulation is executed with respect to duplexed communication between devices.

12. A device as set forth in claim 8,
wherein said general purpose interface is an RS232C serial interface.

* * * * *